US009711095B2

United States Patent
Tsuji

(10) Patent No.: US 9,711,095 B2
(45) Date of Patent: Jul. 18, 2017

(54) ELECTRONIC APPARATUS, SECURITY PROCESSING METHOD AND STORAGE MEDIUM

(71) Applicant: Kabushiki Kaisha Toshiba, Minato-ku, Tokyo (JP)

(72) Inventor: Tadashi Tsuji, Mitaka Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 60 days.

(21) Appl. No.: 14/688,154

(22) Filed: Apr. 16, 2015

(65) Prior Publication Data

US 2016/0034681 A1 Feb. 4, 2016

(30) Foreign Application Priority Data

Jul. 29, 2014 (JP) .................. 2014-153851

(51) Int. Cl.
| | |
|---|---|
| *G06F 21/00* | (2013.01) |
| *G09G 3/36* | (2006.01) |
| *G06F 21/88* | (2013.01) |
| *H04W 4/02* | (2009.01) |
| *G06F 3/14* | (2006.01) |

(52) U.S. Cl.
CPC ............... *G09G 3/36* (2013.01); *G06F 3/14* (2013.01); *G06F 21/88* (2013.01); *H04W 4/021* (2013.01); *H04W 4/027* (2013.01); *G06F 2221/2111* (2013.01); *G09G 2358/00* (2013.01); *G09G 2370/025* (2013.01); *G09G 2370/04* (2013.01)

(58) Field of Classification Search
CPC .... G06F 21/88; G06F 2221/2111; G06F 3/14; G09G 3/36; G09G 2358/00; G09G 2370/025; G09G 2370/04; H04W 4/021; H04W 4/027

USPC .......................................................... 726/19
See application file for complete search history.

(56) References Cited

U.S. PATENT DOCUMENTS

| | | | |
|---|---|---|---|
| 5,732,326 A | 3/1998 | Maruyama et al. | |
| 2009/0249497 A1* | 10/2009 | Fitzgerald | H04W 12/12 726/35 |
| 2011/0057797 A1* | 3/2011 | Parker | G08B 21/22 340/568.1 |
| 2011/0140884 A1* | 6/2011 | Santiago | G01S 5/0027 340/539.13 |

(Continued)

FOREIGN PATENT DOCUMENTS

| | | |
|---|---|---|
| JP | H09-018957 A | 1/1997 |
| JP | 2004-021310 A | 1/2004 |
| JP | 2008-306548 A | 12/2008 |

*Primary Examiner* — Yogesh Paliwal
(74) *Attorney, Agent, or Firm* — Knobbe, Martens, Olson & Bear LLP

(57) ABSTRACT

According to one embodiment, an electronic apparatus includes a first detector, a second detector, a third detector and a security controller. The first detector detects a speed of movement of the electronic apparatus. The second detector detects a direction of the movement. The third detector detects whether the electronic device is located in a first area. The security controller updates position information wherein the position information is indicative of a first position in the first area, and executes a monitoring process based on the position information, detection information of the first detector and detection information of the second detector.

6 Claims, 8 Drawing Sheets

(56) References Cited

U.S. PATENT DOCUMENTS

2011/0156901 A1* 6/2011 Culpepper ............ B60R 25/102
340/539.13

* cited by examiner

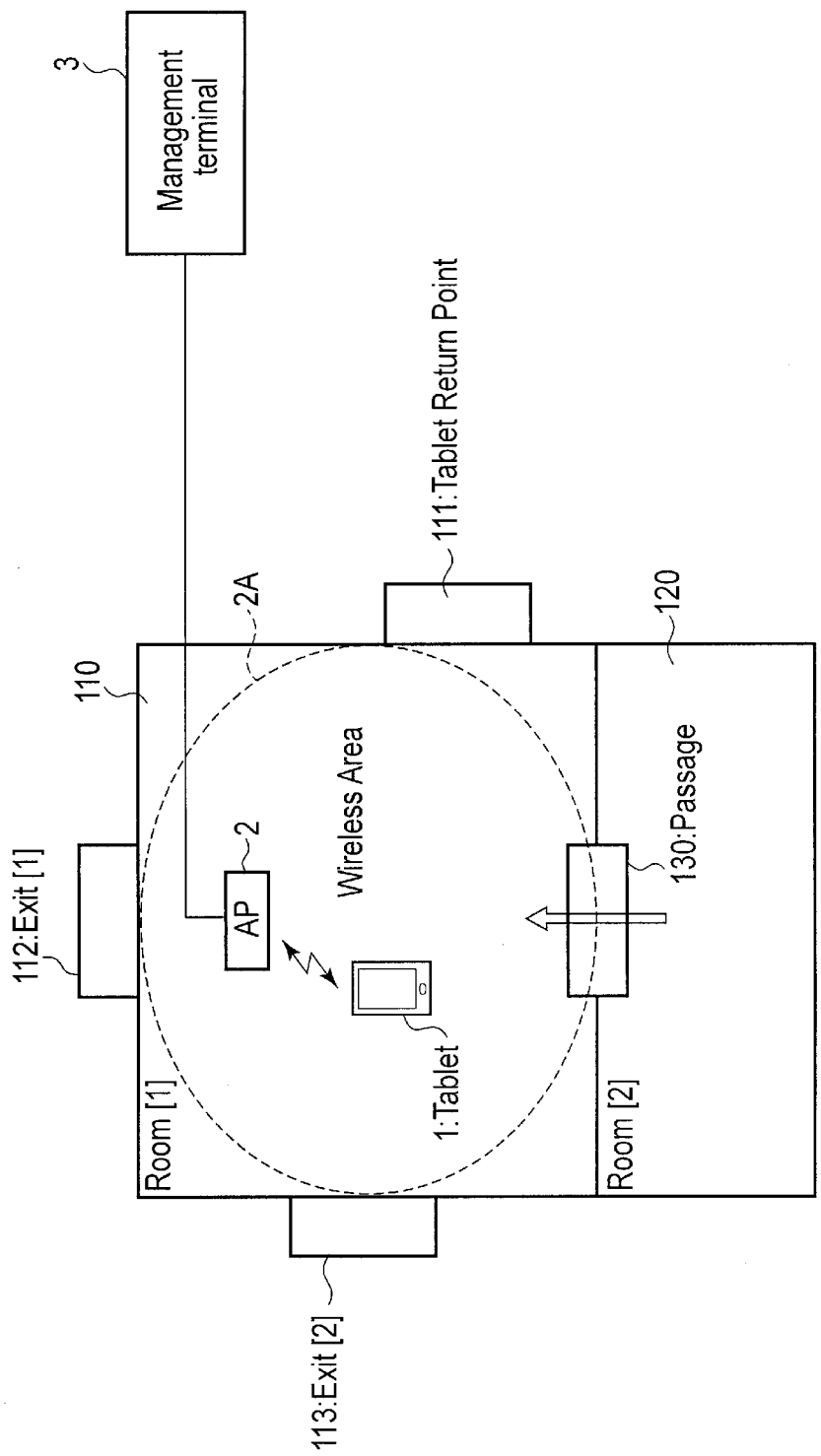
F I G. 1

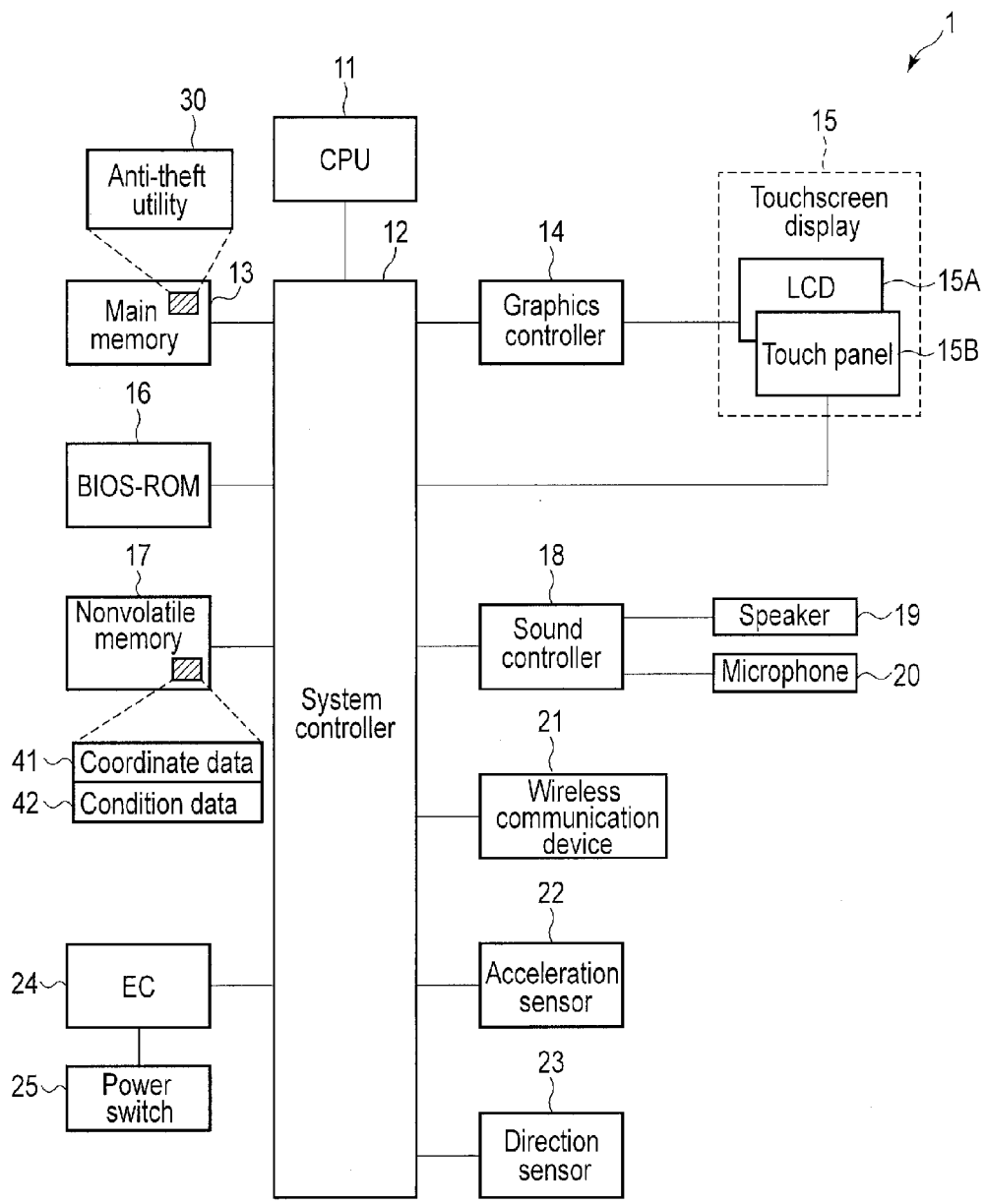
F I G. 2

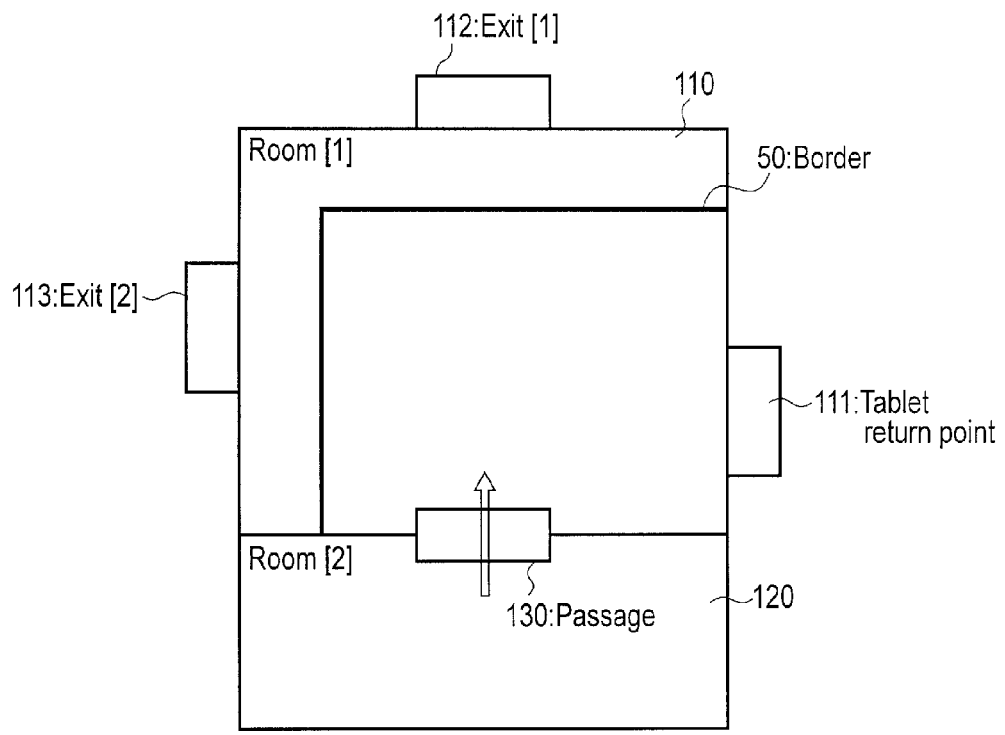
F I G. 9
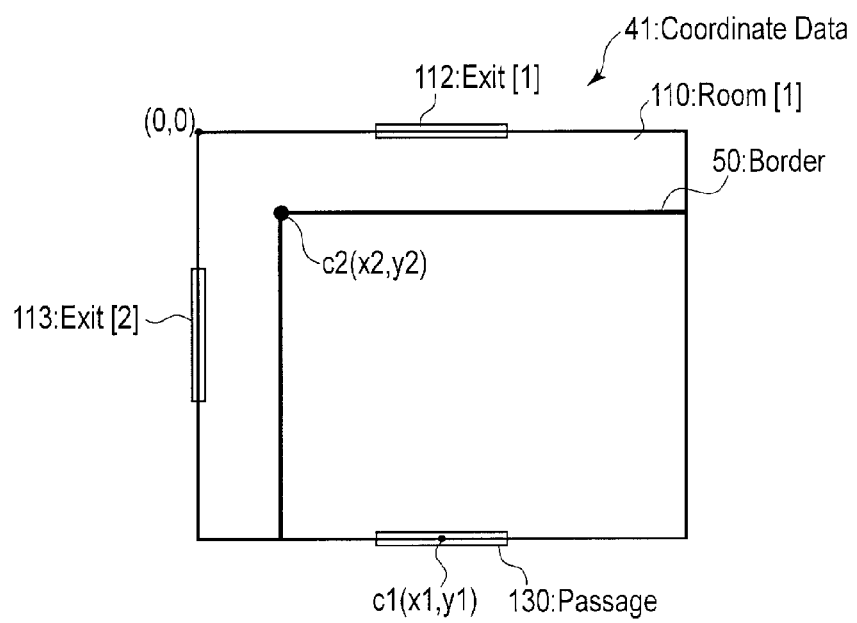
F I G. 10

ELECTRONIC APPARATUS, SECURITY PROCESSING METHOD AND STORAGE MEDIUM

CROSS-REFERENCE TO RELATED APPLICATIONS

This application is based upon and claims the benefit of priority from Japanese Patent Application No. 2014-153851, filed Jul. 29, 2014, the entire contents of which are incorporated herein by reference.

FIELD

Embodiments described herein relate generally to an electronic apparatus, a security processing method and a storage medium.

BACKGROUND

Recently, for example, in art exhibitions held in art museums, a service for lending out a guide device which explains exhibits to visitors has been provided.

In recent years, various types of electronic devices which enable touch input on a display screen have been developed. For example, these devices are called tablets. Use of tablets as guide devices is increasing.

When, as a guide device, a versatile tablet is employed instead of a dedicated device, the tablet which is the guide device on loan might be removed without being returned. Countermeasures to this theft need to be fully considered. Such countermeasures can be preferably realized by only a device mounted on a versatile tablet without relying on an IC tag commonly used in a dedicated device.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary view showing an example of environment in which a tablet of a first embodiment is used.

FIG. 2 is an exemplary view showing a system configuration of the tablet of the first embodiment.

FIG. 9 is an exemplary view showing an example (modification example) of environment in which the tablet of the second embodiment is used.

FIG. 10 is an exemplary second conceptual diagram for explaining the outline of the coordinate data used in the tablet of the second embodiment.

DETAILED DESCRIPTION

Figures 3, 4:
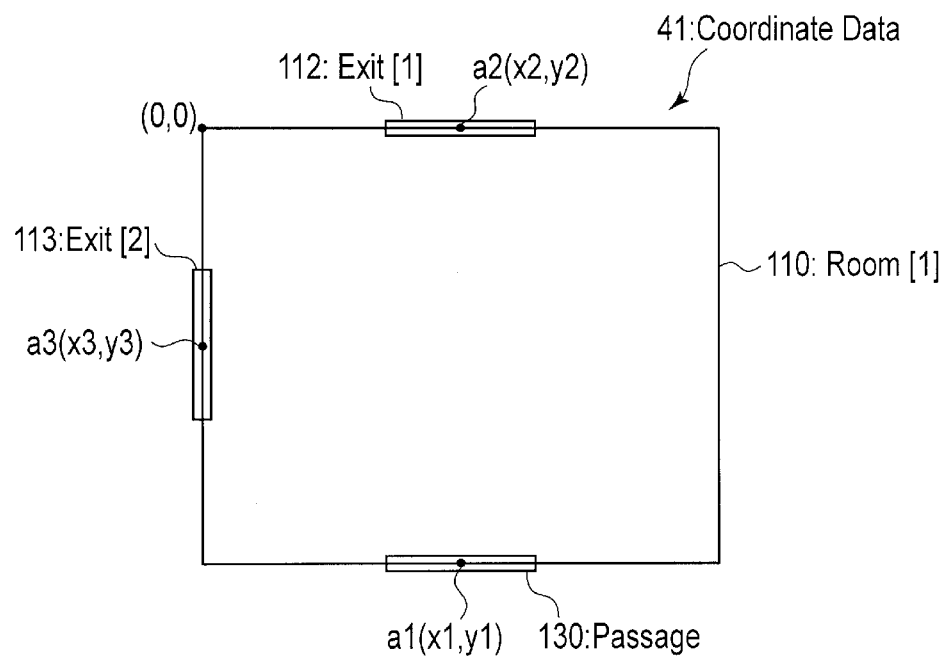
FIG. 3 is an exemplary conceptual diagram for explaining an outline of coordinate data used in the tablet of the first embodiment.
FIG. 4 is an exemplary view showing an example of condition data used in the tablet of the first embodiment.

Various embodiments will be described hereinafter with reference to the accompanying drawings.

In general, according to one embodiment, an electronic apparatus includes a first detector, a second detector, a third detector and a security controller. The first detector detects a speed of movement of the electronic apparatus. The second detector detects a direction of the movement. The third detector detects whether the electronic device is located in a first area. The security controller updates position information wherein the position information is indicative of a first position in the first area, and executes a monitoring process based on the position information, detection information of the first detector and detection information of the second detector.

First Embodiment

A first embodiment is explained.

FIG. 1 is an exemplary view showing an example of environment in which an electronic apparatus of the present embodiment is used. In the present embodiment, the electronic apparatus is assumed to be realized as a tablet 1. In the present embodiment, for example, the tablet 1 is assumed to be lent out to visitors as a guide device which explains exhibits in art exhibitions held in art museums.

In FIG. 1, room [2] 120 is the final exhibition hall. Visitors go through a passage 130 to room [1] 110 including a tablet return point 111, exit [1] 112 and exit [2] 113. Visitors who borrowed the tablet 1 return the tablet 1 to the tablet return point 111, and leave room [1] 110 through exit [1] 112 or exit [2] 113. If a visitor leaves room [1] 110 through exit [1] 112 or exit [2] 113 while the visitor holds the tablet 1, for example, it is necessary to warn the visitor to return the tablet 1. In the present embodiment, the tablet 1 accurately detects a visitor removing the tablet 1 by using an existing device in the tablet 1. This feature is described in detail below.

As shown in FIG. 1, a predetermined wireless area 2A is formed by an access point (AP) 2 in room [1] 110. When the tablet 1 is present in the wireless area 2A, the tablet 1 can communicate with a management terminal 3 via the access point 2. For example, wireless communication compliant with WiFi (registered trademark) standards is executed between the tablet 1 and the access point (AP) 2.

FIG. 2 is an exemplary view showing a system configuration of the tablet 1.

As shown in FIG. 2, the tablet 1 comprises a CPU 11, a system controller 12, a main memory 13, a graphics controller 14, a touchscreen display 15, a BIOS-ROM 16, a nonvolatile memory 17, a sound controller 18, a speaker 19 and a microphone 20. The tablet 1 further comprises a wireless communication device 21, an acceleration sensor 22, a direction sensor 23, an embedded controller (EC) 24 and a power switch 25. Moreover, the tablet 1 comprises various devices which are not shown in FIG. 2, such as a vibration generator for realizing a vibration function, a GPS module for realizing a navigation function, and an illumination sensor for controlling the brightness of the display screen depending on the surrounding environment. The illumination sensor can be used for detecting an electromagnetic wave (light) having a predetermined frequency in addition to the brightness.

The CPU 11 is a processor which controls operations of various components in the tablet 1. The CPU 11 loads various types of software from the nonvolatile memory 17 to the main memory 13, and executes the software. By the software, the tablet 1 operates as a guide device which explains exhibits. In other words, there is no need to add particular hardware in order to use the tablet 1 as a guide device. The software includes an anti-theft utility program 30. The anti-theft utility program 30 is explained later. The CPU 11 executes a BIOS stored in the BIOS-ROM 16. The BIOS is a program for hardware control.

The system controller 12 is a device which connects a local bus of the CPU 11 and various components. The system controller 12 comprises various built-in controllers for controlling driving of various components such as a memory controller configured to control the access of the main memory 13.

The graphics controller 14 is a display controller which controls an LCD 15A incorporated into the touchscreen display 15. The LCD 15A displays a screen image based on a display signal generated by the graphics controller 14. A touchpanel 15B is provided on the LCD 15A. The touchpanel 15B is a pointing device for inputting data on the screen of the LCD 15A.

The sound controller 18 is a device which controls processes related to sound output from the speaker 19 and sound input from the microphone 20. The sound controller 18 can be used for detecting an acoustic wave having a predetermined frequency via the microphone 20. The wireless communication device 21 is a device which performs wireless communication compliant with, for example, WiFi (registered trademark) standards as mentioned above. The wireless communication device 21 can obtain identification information (of the access point 2) from the access point 2 when the wireless communication device 21 enters the wireless area 2A. That is, the wireless communication device 21 can be used for detecting the entry into the predetermined wireless area 2A. The acceleration sensor 22 is a sensor for detecting the orientation and moving speed of the tablet 1. The direction sensor 23 is a sensor for detecting the moving direction of the tablet 1. The acceleration sensor 22 and the direction sensor are provided for realizing, for example, the navigation function (together with the GPS module which is not shown in FIG. 2).

The EC 24 is a single-chip microcomputer comprising a circuit for power management. The EC 24 comprises a function for turning on/off the tablet 1 in accordance with the operation of the power switch 25 by the user.

Next, this specification explains the operation principle of the anti-theft utility program 30 operating in the tablet 1 having the above-described system configuration.

The anti-theft utility program 30 is a program which is installed for monitoring the removal of the tablet 1. As the parameter of the anti-theft utility program 30, coordinate data 41 and condition data 42 are prepared in the nonvolatile memory 17.

FIG. 3 is an exemplary conceptual diagram for explaining an outline of the coordinate data 41.

The coordinate data 41 is data including point a1 indicating the position of the passage 130 which is the access gate to room [1] 110, point a2 indicating the position of exit [1] 112 which is an exit from room [1] 110, and point a3 indicating the position of exit [2] 113 which is an exit from room [1] 110. For example, points a1 to a3 are based on the upper-left end of room [1] 110.

As stated above, the tablet 1 comprises the wireless communication device 21 which performs wireless communication compliant with, for example, WiFi (registered trademark) standards. The wireless communication device 21 can be used for detecting the entry into the predetermined wireless area 2A which is formed in room [1] 110 by the access point 2. When the entry into the predetermined wireless area 2A is detected, the anti-theft utility program 30 corrects position information indicating the current position of the tablet 1 such that the position information indicates point a1 included in the coordinate data 41, or in short, the position of the passage 130 which is the access gate to room [1] 110. After correcting the position information, the anti-theft utility program 30 tracks and monitors the movement of the visitor carrying the tablet 1 based on the position information, and detection information of the acceleration sensor 22 and the direction sensor 23. The anti-theft utility program 30 calculates the moving speed from the detection information of the acceleration sensor 22, obtains the moving direction from the detection information of the direction sensor 23, and updates the position information by the moving distance in real time.

As explained above, for example, even inside a building in which no GPS module can be used, the tablet 1 can accurately recognize the current position of the tablet 1 in room [1] 110.

FIG. 4 is an exemplary view showing an example of the condition data 42.

The condition data 42 is data showing what kind of movement of the visitor carrying the tablet 1 should be regarded as being such that there is a risk of the visitor removing the tablet 1 without returning it. Here, this specification assumes that the tablet 1 is regarded as being at risk of removal when the visitor moves 2 m (condition 2) at a speed of 100 m per minute (condition 1) toward exit [1] 112 or exit [2] 113 (basic condition). The condition data 42 is data including two values which are the moving speed and moving distance. In this case, as shown in FIG. 4, the condition data 42 includes two values which are 100 m per minute as the moving speed and 2 m as the moving distance.

As explained above, when the entry into the predetermined wireless area 2A is detected, the anti-theft utility program 30 corrects the position information indicating the current position of the tablet 1 such that the position information indicates the position of the passage 130 which is the access gate to room [1] 110. Using the position of the passage 130 as an origination point, the anti-theft utility program 30 tracks and monitors the movement of the visitor carrying the tablet 1 based on the detection information of the acceleration sensor 22 and the direction sensor 23. When the movement of the visitor carrying the tablet 1 is toward an exit (basic condition) and conforms to the conditions shown by the condition data 42, the anti-theft utility program 30 executes various warning processes to prompt the visitor to return the tablet 1.

For example, the anti-theft utility program 30 outputs an alarm or a waning message (sound) from the speaker 19, activates the vibration function, or displays a warning message (image) on the LCD 15A. At this time, the anti-theft utility program 30 may communicate with the management terminal 3 via the access point 2 by using the wireless communication device 21, require the management terminal 3 to output an alarm or a warning message (sound or image) and inform the administrator that the tablet 1 is at risk of removal.

For example, when the moving speed is decreased to a speed lower than the value shown by the condition data 42 (100 m per minute) after various warning processes are executed, the anti-theft utility program 30 may stop the warning processes.

Figure 5:
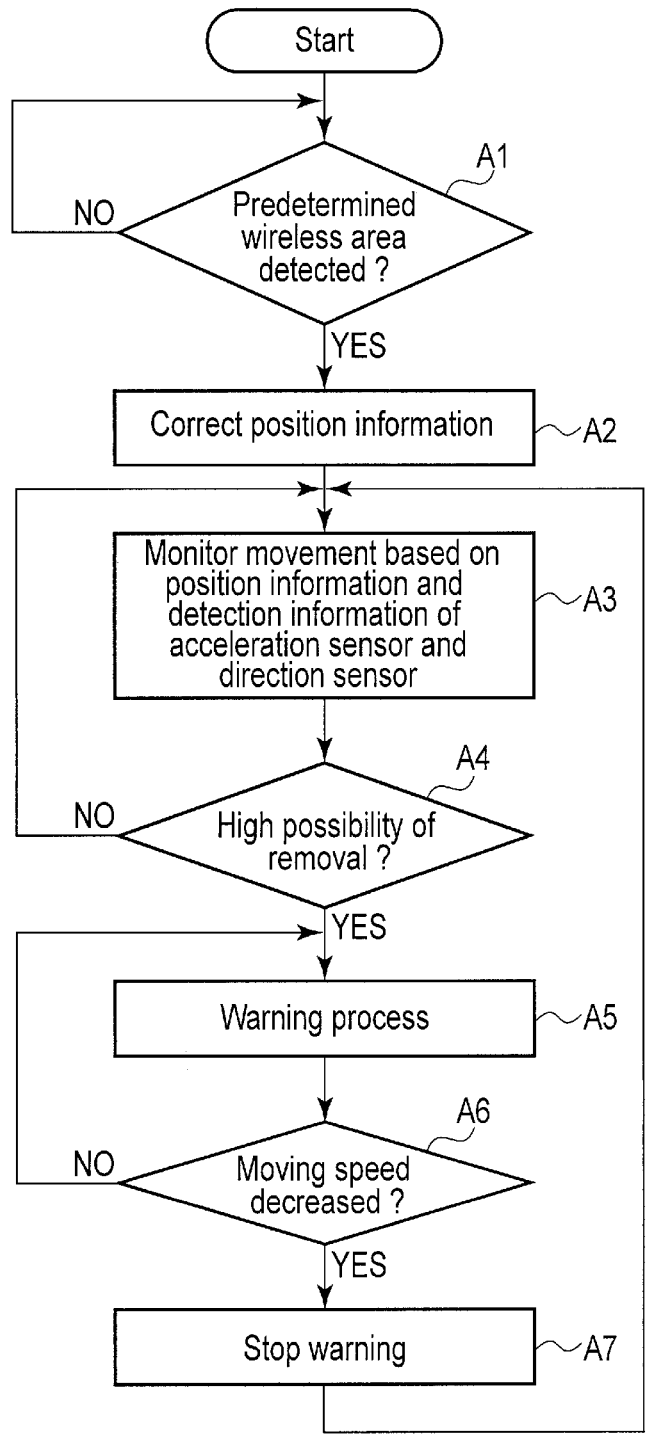
FIG. 5 is an exemplary flowchart showing operation procedures of the tablet of the first embodiment.

FIG. 5 is an exemplary flowchart showing operation procedures of the tablet 1.

When detecting the predetermined wireless area 2A (YES in block A1), the tablet 1 corrects the position information such that the position information indicates the position of the passage 130 (block A2). After correcting the position information, the tablet 1 monitors the movement of the visitor carrying the tablet 1 based on the position information, and the detection information of the acceleration sensor 22 and the direction sensor 23 (block A3).

When the movement of the visitor carrying the tablet 1 may be regarded as being such that the tablet 1 is at risk of removal (YES in block A4), the tablet 1 executes various warning processes to prompt the visitor to return the tablet 1 (block A5). When the moving speed is decreased (YES in block A6), the tablet 1 stops the warning processes (block A7).

As described above, in the present embodiment, the tablet 1 can execute various warning processes to prompt the visitor to return the tablet 1 by using an existing device in the tablet 1 when the movement of the visitor may be regarded as being such that there is a risk of the visitor removing the tablet 1, not after but before the visitor actually leaves room [1] 110 through exit [1] 112 or exit [2] 113 with the tablet 1.

In the above example, the entry of the tablet 1 into the wireless area 2A is detected by using the wireless communication device 21. When the entry is detected, the visitor carrying the tablet 1 is regarded as entering from the passage 130 into room [1] 110, and the position information is corrected. Instead of this configuration, for example, when the sound controller 18 detects an acoustic wave having a predetermined frequency, or when the illumination sensor detects an electromagnetic wave (light) having a predetermined frequency, the position information may be corrected.

Second Embodiment

Next, a second embodiment is explained.

Figure 6:
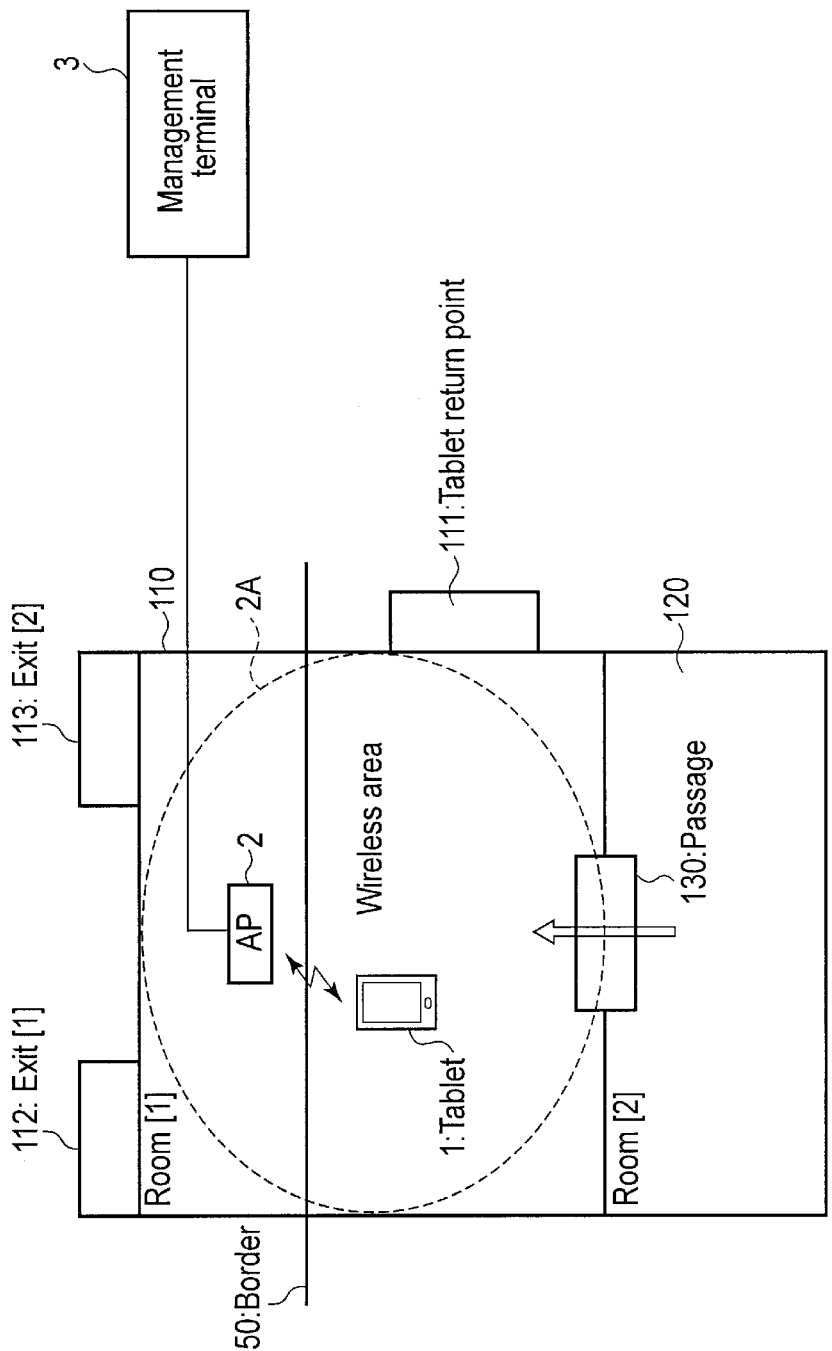
FIG. 6 is an exemplary view showing an example of environment in which a tablet of a second embodiment is used.

FIG. 6 is an exemplary view showing an example of environment in which an electronic apparatus of the present embodiment is used. As with the first embodiment, in the present embodiment, the electronic apparatus is realized as a tablet 1, and is assumed to be, for example, lent out to visitors as a guide device which explains exhibits in art exhibitions in art museums. In the present embodiment, the same components as the first embodiment are denoted by the same reference numbers as the first embodiment.

In the first embodiment, when the visitor carrying the tablet 1 moves in an exit direction, the tablet 1 is regarded as being at risk of removal. In the present embodiment, a border 50 is set in room [1] 110. When the tablet 1 has been taken beyond the border 50 in an exit direction, the tablet 1 is regarded as being at risk of removal. To simplify the explanation, as shown in FIG. 6, this specification assumes that exit [1] 112 and exit [2] 113 are provided on a side opposite to a passage 130 of room [1] 110.

Figure 7:
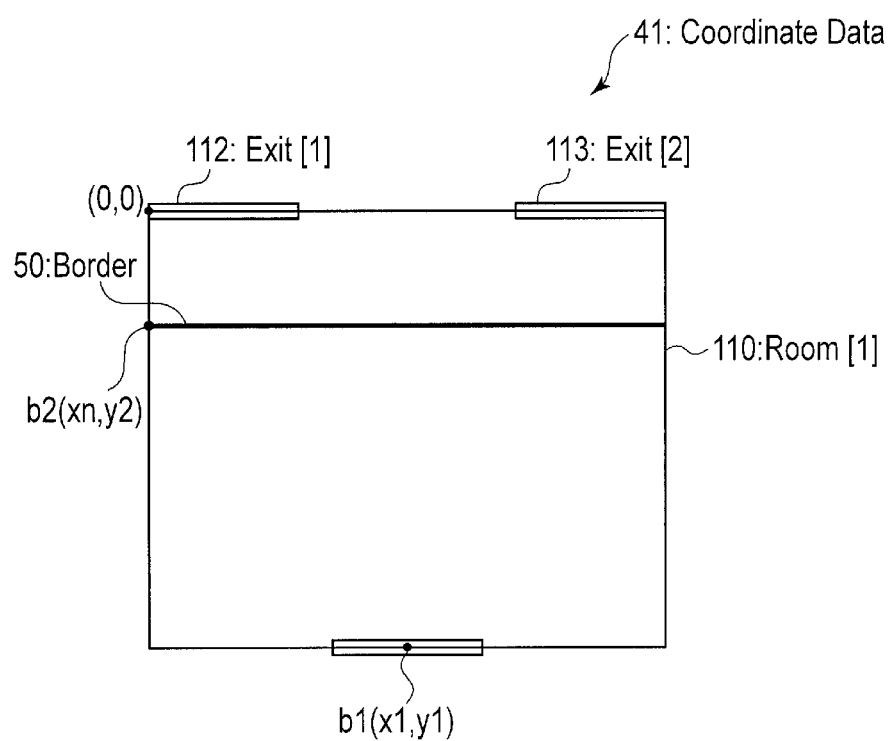
FIG. 7 is an exemplary conceptual diagram for explaining an outline of coordinate data used in the tablet of the second embodiment.

FIG. 7 is an exemplary conceptual diagram for explaining an outline of coordinate data 41 in the present embodiment.

For example, the coordinate data 41 is data including point b1 indicating the position of the passage 130 which is the access gate to room [1] 110 and point b2 indicating the position of the border 50. Points b1 and b2 are based on the upper-left end of room [1] 110. In the present embodiment, condition data 42 is unnecessary.

As with the first embodiment, when the entry into a predetermined wireless area 2A is detected, an anti-theft utility program 30 corrects position information indicating the current position of the tablet 1 such that the position information indicates the position of the passage 130 which is the access gate to room [1] 110. Using the position of the passage 130 as an origination point, the anti-theft utility program 30 tracks and monitors the movement of the visitor carrying the tablet 1 based on detection information of an acceleration sensor 22 and a direction sensor 23. In the present embodiment, when the visitor carrying the tablet 1 goes beyond the border 50 in an exit direction, the anti-theft utility program 30 executes various warning processes to prompt the visitor to return the tablet 1. When the border 50 is set as shown in FIG. 6, and the value of the y-coordinate of the position information indicating the current position of the tablet 1 is less than the value of the y-coordinate of point b2 indicating the position of the border 50 included in the coordinate data 41, the anti-theft utility program 30 may determine that the visitor has gone beyond the border 50 in an exit direction.

For example, when the visitor returns from an exit direction and goes beyond the border 50 after the anti-theft utility program 30 executes various warning processes, the anti-theft utility program 30 may stop the warning processes.

Figure 8:
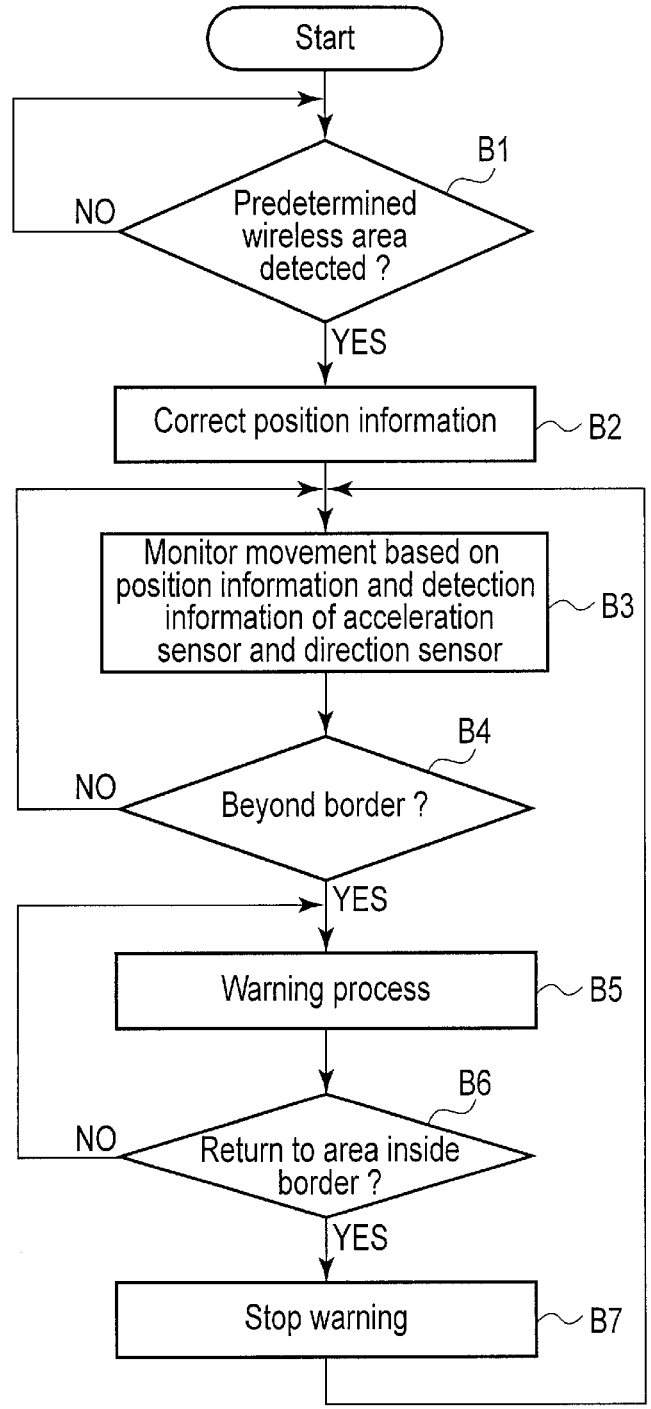
FIG. 8 is an exemplary flowchart showing operation procedures of the tablet of the second embodiment.

FIG. 8 is an exemplary flowchart showing operation procedures of the tablet 1 in the present embodiment.

When detecting the predetermined wireless area 2A (YES in block B1), the tablet 1 corrects the position information such that the position information indicates the position of the passage 130 (block B2). After correcting the position information, the tablet 1 monitors the movement of the visitor carrying the tablet 1 based on the position information, and the detection information of the acceleration sensor 22 and the direction sensor 23 (block B3).

When the visitor carrying the tablet 1 goes beyond the border set in room [1] 110 in an exit direction (YES in block B4), the tablet 1 executes various warning processes to prompt the visitor to return the tablet 1 (block B5). When the visitor carrying the tablet 1 returns from an exit direction and goes beyond the border 50 (YES in block B6), the tablet 1 stops the warning processes (block B7).

Thus, as with the first embodiment, the tablet 1 of the present embodiment can execute various warning processes to prompt the visitor to return the tablet 1 by using an existing device in the tablet 1 when the movement of the visitor may be regarded as being such that the tablet 1 is at risk of removal, not after but before the visitor actually leaves room [1] 110 through exit [1] 112 or exit [2] 113 with the tablet 1.

In the above example, to simplify the explanation, this specification assumes that exit [1] 112 and exit [2] 113 are provided on a side opposite to the passage 130 of room [1] 110. For example, even when exit [1] 112 and exit [2] 113 are provided in the same manner as the first embodiment, various warning processes can be appropriately executed to prompt the visitor to return the tablet 1 by setting the border 50 as shown in FIG. 9.

FIG. 10 is an exemplary conceptual diagram for explaining the outline of the coordinate data 41 when the border 50 is set as shown in FIG. 9.

For example, the coordinate data 41 is data including point c1 indicating the position of the passage 130 which is the access gate to room [1] 110 and point c2 indicating the position of the border 50. Points c1 and c2 are based on the upper-left end of room [1] 110.

When the border 50 is set as shown in FIG. 9, and the value of the x-coordinate of the position information indicating the current position of the tablet 1 is less than the value of the x-coordinate of point c2 indicating the position of the border 50 included in the coordinate data 41, or the value of the y-coordinate of the position information indicating the current position of the tablet 1 is less than the value of the y-coordinate of point c2 indicating the position of the border 50 included in the coordinate data 41, the anti-theft utility program 30 can determine that the visitor has gone beyond the border 50 in an exit direction.

The operation procedures of each embodiment can be realized by software (programs). Therefore, by installing the software through a computer-readable storage medium in which the software is stored into a normal computer, and executing the software, an effect similar to that of each embodiment can be easily obtained.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
    a first detector to detect a speed of movement of the electronic apparatus;
    a second detector to detect a direction of the movement;
    a wireless communication device; and
    a processor configured to:
    detect whether the electronic apparatus is located in a first area, by the wireless communication device;
    update position information wherein the position information is indicative of a first position in the first area when it is detected that the electronic apparatus is located in the first area; and
    execute a monitoring process based on the updated position information, information of the speed of the movement detected by the first detector and information of the direction of the movement detected by the second detector,
    wherein the processor is configured to:
    give warning when the first detector detects a first speed or faster and the second detector detects a first distance or longer toward a second position in the first area, the second position indicating an exit of the first area; and
    stop the warning when the speed is decreased to a speed slower than the first speed.

2. The apparatus of claim 1, wherein the processor comprises information indicative of a border set in the first area, and gives the warning when the movement is performed beyond the border from a side on which the first position is located toward the exit.

3. The apparatus of claim 2, wherein the processor stops the warning when the movement is performed beyond the border to return from a direction of the exit after the movement is performed beyond the border toward the exit.

4. The apparatus of claim 1,
    wherein the processor detects the entry into the first area when an access point forming a wireless area in the first area is wirelessly connected to the wireless communication device.

5. A security processing method of an electronic apparatus, the method comprising:
    detecting a speed of movement of the electronic apparatus;
    detecting a direction of the movement;
    detecting whether the electronic apparatus is located in a first area;
    updating position information wherein the position information is indicative of a first position in the first area when it is detected that the electronic apparatus is located in the first area;
giving warning when a first speed or faster is detected and a first distance or longer toward a second position in the first area is detected, based on the updated position information, detection information of the speed and detection information of the direction, the second position indicating a exit of the first area; and
stopping the warning when the speed is decreased to a speed slower than the first speed, based on the updated position information, the detection information of the speed and the detection information of the direction.

6. A computer-readable, non-transitory storage medium having stored thereon a computer program which is executable by a computer of an electronic apparatus which comprises a first detector configured to detect a speed of movement of the electronic apparatus, a second detector configured to detect a direction of the movement, and a third detector configured to detect whether the electronic apparatus is located in a first area, the computer program controlling the computer to execute functions of:
    updating position information wherein the position information is indicative of a first position in the first area when the third detector detects that the electronic apparatus is located in the first area;
    giving warning when a first speed or faster is detected and a first distance or longer toward a second position in the first area is detected, based on the updated position information, information of the speed of the movement detected by the first detector and information of the direction of the movement detected by the second detector, the second position indicating a exit of the first area; and
    stopping the warning when the speed is decreased to a speed slower than the first speed, based on the updated position information, the information of the speed of the movement detected by the first detector detection and the information of the direction of the movement detected by the second detector.

* * * * *